United States Patent [19]

Pfefferle

[11] 4,341,662

[45] Jul. 27, 1982

[54] METHOD OF CATALYTICALLY COATING LOW POROSITY CERAMIC SURFACES

[76] Inventor: William C. Pfefferle, 51 Woodland Dr., Middletown, N.J. 07748

[21] Appl. No.: 139,340

[22] Filed: Apr. 11, 1980

[51] Int. Cl.³ .......................... B01J 21/04; B01J 23/10; B01J 23/40
[52] U.S. Cl. .............................. 252/462; 252/466 PT; 252/472
[58] Field of Search ................. 252/460, 462, 466 PT, 252/472; 427/125

[56] References Cited

U.S. PATENT DOCUMENTS

| | | | |
|---|---|---|---|
| 3,224,981 | 12/1965 | Stephens et al. | 252/460 |
| 3,513,109 | 5/1970 | Stiles | 252/462 |
| 3,912,661 | 10/1975 | Numagami et al. | 252/466 PT |
| 4,061,713 | 12/1977 | Weidenbach et al. | 252/466 PT |

*Primary Examiner*—W. J. Shine

[57] ABSTRACT

A method is disclosed for coating non-porous or low porosity ceramic surfaces with a catalytically active film comprising a platinum group metal and a minor amount of a refractory metal oxide. The method comprises applying a thermally decomposable compound of a precious metal and a compound decomposable into a refractory metal oxide to a ceramic surface and decomposiing said compounds in the presence of air.

5 Claims, No Drawings

METHOD OF CATALYTICALLY COATING LOW POROSITY CERAMIC SURFACES

BACKGROUND OF THE INVENTION

This invention relates to a method of preparing catalytically active precious metal coatings on sintered ceramic surfaces. The catalytic coatings are comprised of a precious metal and a refractory metal oxide and are bonded to the ceramic surface by heating in air. Such coatings are useful for the oxidation of ammonia and for the selective oxidation of hydrocarbons.

The usual procedures for coating ceramic materials with precious metal catalytic surfaces require not only porosity in the surface to be coated but a relatively high surface area per unit weight. Generally, the surface area is at least about 25 square meters per gram and preferably at least about 100 square meters per gram. For catalyst supports of low surface area, the high surface area wash coat is used to enhance surface area. To assure adequate bonding of the wash coat, it is necessary that the surface pores be of a larger size than the wash coat particles. Typically, such pores should be of a size in excess of 0.5 microns and total porosity in the range of 0.1 to 0.3 cc/gm. Such catalysts typically offer limited selectivity in partial oxidation reactions.

SUMMARY OF THE INVENTION

This invention eliminates a major disadvantage of prior art methods in that it has been discovered that stable, adherent catalytic precious metal coatings can be applied to low porosity and non-porous ceramic surfaces by coating said surfaces with a film comprising a precious metal compound and a minor amount of a compound decomposable into a refractory metal oxide and heating the coated surfaces in air above the decomposition temperature of said compounds. Thus, the present invention provides a method of eliminating the waste of precious metal buried within the pores of porous substrates and makes possible more selective precious metal catalysts. The coatings of the present invention accordingly make possible more efficient catalysts for processes such as the oxidation of ammonia to produce nitric acid and the partial oxidation of hydrocarbons to oxygenated compounds. The coatings of the present invention are also useful as reignition surfaces for refinery safety flares and other combustion systems. The precious metals of this invention are those known as noble metals.

It is therefore an object of the present invention to provide a method for coating low porosity and non-porous ceramic surfaces with adherent precious metal catalytic coatings. Another object is to provide a method of making precious metal catalysts of improved selectivity. Still other objects will be apparent to those skilled in the art.

DESCRIPTION OF THE PREFERRED EMBODIMENTS

In a preferred embodiment of the present invention, the substrate surface to be coated is cleaned, if necessary, by solvent washing and then dried in air at an elevated temperature to remove solvent. To a clean surface, a coating is applied comprising a solution in water of one or more precious metal halides and a nitrate of a metal which forms a refractory metal oxide which can bond to the material of the substrate surface. The coated surface is then cured by heating to about 250 F. for about 15 minutes and then heated in air to a temperature above the decomposition temperature of the metal nitrate for a period of about one hour, e.g. to about 1300 F. Preferably, the coating should be fired at a temperature at least as high as the intended use temperature. During heating, precious metal compound(s) convert to metal and metal nitrate to refractory metal oxide which oxide serves to bond the resulting catalytic film to the surface. Preferably the refractory metal oxide is alumina, ceria, thoria or zirconia and comprises between 0.1% and 50% by weight of the catalytic film.

In another embodiment of the invention, an aqueous solution comprising chloroplatinic acid, zirconyl nitrate and aluminum nitrate is brushed on to a clean, dense alumina plate in light even coats. After each coat the plate is dried in an oven at 220 F. and cured at 300 F. for twenty minutes. The coated plate is then placed in an air circulating furnace, fired at 1800 F. for one hour, and then air cooled to room temperature. The catalytic film advantageously contains between 0.1% and 75% by weight, preferably less than 50%, refractory metal oxide depending on the intended use. Firing temperature should be at least 200 F. below the melting point of the metal oxide.

A preferred composition is as follows:
a. 2 gm platinum metal in the form of chloroplatinic acid
b. 1 gm aluminum nitrate
c. 5 cc zirconyl nitrate solution containing about 1.5 gms zirconyl nitrate The catalytic film, in accordance with the method of the present invention, has the film of catalytic metal (e.g. platinum, palladium, rhodium or combinations thereof) bonded to the ceramic surface. With glazed surfaces, the coating is facilitated if a wetting agent such as isopropanol is added to the coating solution. To prevent contamination of the coating, it is advisable that no metallic implements contact the coating or the coating solution. The refractory metal oxide should melt well above the intended use temperature and preferably above 2000 F. Suitable refractory metal oxides include alumina, ceria, thoria and zirconia. For the purpose of this invention, a low porosity ceramic is one having an accessible pore volume of no more than 0.025 cc/gm. The coating is heated in air at a temperature of at least 1300 F. Often, the coating is heated in air at a temperature of at least 1800 F. but no higher than 200 F. below the melting point of the refractory metal oxide.

Aside from the above described embodiments of the present invention, other embodiments will be readily apparent to those skilled in the art. Thus, it will be apparent that the invention is susceptible to modification and change without departing from the proper scope of the subjoined claims.

I claim:
1. The method of catalytically coating low porosity ceramic surfaces with a catalytically active precious metal film which comprises the steps of applying a coating comprising a solution of a solvent, a precious metal compound and a second metal compound decomposable into a refractory metal and of heating said coating in air to a temperature above the decomposition temperature of said second compound to convert the precious metal compound to metal and other compound to refractory metal oxide whereby the precious metal is bonded to the ceramic surface by refractory metal oxide.

2. The method of claim 1 in which the precious metal is platinum, palladium or rhodium and the second compound is a nitrate of a refractory oxide forming metal.

3. The method of claim 2 in which the coating is heated in air at a temperature of at least 1300° F.

4. The method of claim 2 in which the coating is heated in air at a temperature of at least 1800° F. but no higher than 200° F. below the melting point of said refractory metal oxide.

5. The method of claim 2 in which the refractory metal oxide is alumina, ceria, thoria or zirconia and comprises between 0.1% and 50% by weight of the catalytic film.

* * * * *